(12) United States Patent
Yoshida et al.

(10) Patent No.: US 8,332,499 B2
(45) Date of Patent: Dec. 11, 2012

(54) VIRTUAL SPACE MANAGEMENT SYSTEM

(75) Inventors: Kazushi Yoshida, Kanagawa (JP);
Akihito Nagata, Kanagawa (JP);
Shinichiro Mikami, Chiba (JP); Juichi Takahashi, Tokyo (JP); Christopher Jimison, Foster City, CA (US);
Johnnemann Winthrop Nordhagen, San Francisco, CA (US); David Peter Goodenough, Hayward, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 300 days.

(21) Appl. No.: 12/628,418

(22) Filed: Dec. 1, 2009
(Under 37 CFR 1.47)

(65) Prior Publication Data

US 2010/0146097 A1 Jun. 10, 2010

Related U.S. Application Data

(60) Provisional application No. 61/119,787, filed on Dec. 4, 2008.

(51) Int. Cl.
*G06F 15/173* (2006.01)
*G06F 15/16* (2006.01)

(52) U.S. Cl. ........................ 709/223; 709/227
(58) Field of Classification Search .................... 709/223
See application file for complete search history.

(56) References Cited

U.S. PATENT DOCUMENTS

| | | | |
|---|---|---|---|
| 6,490,627 B1 | 12/2002 | Kalra et al. | |
| 6,678,751 B1 | 1/2004 | Hays et al. | |
| 6,738,807 B1 * | 5/2004 | Matsui et al. | 709/223 |
| 7,170,526 B1 | 1/2007 | Johnson | |
| 7,852,764 B2 | 12/2010 | Yamaguchi et al. | |
| 2003/0017872 A1 | 1/2003 | Oishi et al. | |
| 2004/0166942 A1 | 8/2004 | Muir | |
| 2007/0130253 A1 | 6/2007 | Newson et al. | |
| 2007/0213064 A1 | 9/2007 | Togahara | |

(Continued)

FOREIGN PATENT DOCUMENTS

| | | |
|---|---|---|
| JP | 04242467 A | 8/1992 |
| JP | 2005234633 A | 9/2005 |
| WO | 2006057040 A | 6/2006 |
| WO | 2008035600 A1 | 3/2008 |

OTHER PUBLICATIONS

International Search Report for PCT application PCT/JP2009/070236, dated Mar. 2, 2010.

(Continued)

*Primary Examiner* — Firmin Backer
*Assistant Examiner* — Herman Belcher
(74) *Attorney, Agent, or Firm* — Matthew B. Dernier, Esq.; Gibson & Dernier LLP

(57) ABSTRACT

A virtual space management system includes: a plurality of space management servers for respectively managing a plurality of partial spaces obtained by dividing a virtual space; and a communication control server for relaying communication between at least one of the plurality of space management servers and a user terminal. Each space management server executes a process relating to a transition in which a position in the virtual space associated with the user terminal transitions from inside a partial space managed by another space management server to inside a partial space managed by the local space management server. The communication control server maintains communication connection with the user terminal during execution of the process relating to the transition, and changes a transmission destination of data received from the user terminal to the local space management server managing the partial space to which the transition has been made according to the transition.

6 Claims, 7 Drawing Sheets

U.S. PATENT DOCUMENTS

| | | | |
|---|---|---|---|
| 2008/0059639 A1* | 3/2008 | Zhang | 709/227 |
| 2009/0280906 A1 | 11/2009 | Larsen et al. | |
| 2010/0009747 A1 | 1/2010 | Reville et al. | |
| 2010/0106816 A1 | 4/2010 | Gulati et al. | |
| 2010/0113159 A1* | 5/2010 | Chapman et al. | 463/42 |
| 2010/0165846 A1 | 7/2010 | Yamaguchi et al. | |

OTHER PUBLICATIONS

International Preliminary Report and Written Opinion for PCT application PCT/JP2009/070236, dated Jul. 5, 2011.

Akira Sakatoku, "Bunsangata Bubun Kukan no Ketsugo ni yoru Kaso Kukan no Kosehi" Symposium on Multimedia, Distributed Cooperative and Mobile Systems, (DICOMO2007), Ronbunshu IPSJ Symposium Series, vol. 2007, No. 1, [CDROM] IPSJ Symposium Series, Jul. 4, 2007, vol. 2007, pp. 1682-1689 (see English abstract on p. 1682).

Office Action for related U.S. Appl. No. 12/626,535, dated Mar. 30, 2012.

Office Action for related U.S. Appl. No. 12/628,535, dated Oct. 4, 2012.

* cited by examiner

| USER TERMINAL | EVENT INFORMATION |
|---|---|
| USER TERMINAL 6a | ○○○○○ |
| USER TERMINAL 6b | ○○○○ |
| USER TERMINAL 6c | ○○ |

FIG.9

| USER TERMINAL | CONNECTION DESTINATION |
|---|---|
| USER TERMINAL 6a | SWITCHING IN PROGRESS |
| USER TERMINAL 6b | SPACE MANAGEMENT SERVER 5a |
| USER TERMINAL 6c | SPACE MANAGEMENT SERVER 5b |

FIG.10

| CONNECTION DESTINATION | MAXIMUM COMMUNICATION BAND | USE COMMUNICATION BAND |
|---|---|---|
| COMMUNICATION CONTROL SERVER 4a | 500Mbps | 200Mbps |
| USER TERMINAL 6a | 20Mbps | 10Mbps |
| USER TERMINAL 6b | 10Mbps | 10Mbps |
| USER TERMINAL 6c | 1Mbps | 1Mbps |

VIRTUAL SPACE MANAGEMENT SYSTEM

BACKGROUND OF THE INVENTION

1. Field of the Invention

The present invention relates to a virtual space management system which manages a virtual space, a communication control server comprising the virtual space management system, a control method for the communication control server, and an information recording medium.

2. Description of the Related Art

In an on-line game or the like in which a plurality of users participate, for example, a virtual space management system which manages a virtual space is constructed, and objects associated with individual users or the like are arranged in the virtual space (see Japanese Patent Application Laid-open No. 2005-234633).

SUMMARY OF THE INVENTION

In the virtual space management system described above, when the virtual space to be managed is large and many users participate, the virtual space is divided into a plurality of partial spaces and servers (space management servers) which manage the divided partial spaces are disposed for the respective partial spaces in order to distribute the processing load. In this case, when a position in the virtual space associated with a user terminal (user position) transitions from inside a partial space which is managed by one space management server to inside a partial space which is managed by another space management server, the user terminal needs to terminate communication connection with the space management server that manages the partial space to which the user position has belonged so far, and newly establish communication connection with a space management server that manages the partial space to which the transition has been made. While such switching of communication connection is taking place, the user terminal cannot carry out a user manipulation for the virtual space, which may make the user wait.

The present invention has been made in view of the above-mentioned circumstance, and it is therefore an object of the present invention to provide a virtual space management system, a communication control server, a control method therefor, and an information recording medium, which can carry out a transition process on a partial space to which the user position belongs without interrupting the user's operation.

A virtual space management system according to the present invention includes: a plurality of space management servers for respectively managing a plurality of partial spaces obtained by dividing a virtual space; and a communication control server for relaying communication between at least one of the plurality of space management servers and a user terminal. Each of the plurality of space management servers includes user transition control means for executing a process relating to a transition in which a position in the virtual space associated with the user terminal transitions from inside a partial space which is managed by another space management server to inside a partial space which is managed by a local space management server. The communication control server includes connection destination management means for maintaining communication connection with the user terminal during execution of the process relating to the transition, and changing a transmission destination of data received from the user terminal to the local space management server which manages the partial space to which the transition has been made according to the transition.

In the virtual space management system, the user transition control means may notify the communication control server of completion of the process relating to the transition, and when receiving a notification of the completion of the process relating to the transition, the connection destination management means may change the transmission destination of the data received from the user terminal to the local space management server which has made the notification.

Further, in the virtual space management system, during the execution of the process relating to the transition, the communication control server may maintain the communication connection with the other space management server which manages the partial space before the transition and the local space management server which manages the partial space to which the transition has been made.

Further, in the virtual space management system, the user transition control means may notify the communication control server of initiation of a transition in which the position in the virtual space associated with the user terminal transitions from inside the partial space which is managed by the local space management server to inside a partial space which is managed by another space management server, and the connection destination management means may buffer information received from the user terminal until reception of notification of completion of the transition after reception of notification of the initiation of the transition, and, after receiving the notification of the completion of the transition, transmit the buffered information to the other space management server which has made the notification.

Further, in the virtual space management system, the connection destination management means may hold, as connection destination information, information specifying a space management server that manages a partial space to which the position in the virtual space associated with the user terminal belongs, and, when receiving a notification of completion of the transition, may update the connection destination information to information specifying a space management server that has made the notification, and the communication control server may determine the transmission destination of the data received from the user terminal by referring to the connection destination information.

Further, another virtual space management system according to the present invention includes: a plurality of space management servers for respectively managing a plurality of partial spaces obtained by dividing a virtual space; and a communication control server for relaying communication between at least one of the plurality of space management servers and a user terminal. Each of the plurality of space management servers includes a user transition control unit for executing a process relating to a transition in which a position in the virtual space associated with the user terminal transitions from inside a partial space which is managed by another space management server to inside a partial space which is managed by a local space management server. The communication control server includes a connection destination management unit for maintaining communication connection with the user terminal during execution of the process relating to the transition, and changing a transmission destination of data received from the user terminal to the local space management server which manages the partial space to which the transition has been made according to the transition.

Further, a communication control server according to the present invention relays communication between at least one of a plurality of space management servers for respectively managing a plurality of partial spaces obtained by dividing a virtual space, and a user terminal. The communication control server includes connection destination management means for maintaining, upon transition of a position in the virtual space associated with the user terminal from inside a partial space which is managed by a space management server to inside a partial space which is managed by another space management server, communication connection with the user terminal while the other space management server is executing a process relating to the transition, and changing a transmission destination of data received from the user terminal to the other space management server according to the transition.

Further, according to the present invention, a control method for a communication control server for relaying communication between at least one of a plurality of space management servers for respectively managing a plurality of partial spaces obtained by dividing a virtual space, and a user terminal, includes: maintaining, upon transition of a position in the virtual space associated with the user terminal from inside a partial space which is managed by a space management server to inside a partial space which is managed by another space management server, communication connection with the user terminal while the other space management server is executing a process relating to the transition; and changing a transmission destination of data received from the user terminal to the other space management server according to the transition.

Further, an information recording medium according to the present invention is a computer readable information recording medium, storing a program for causing a communication control server for relaying communication between at least one of a plurality of space management servers for respectively managing a plurality of partial spaces obtained by dividing a virtual space, and a user terminal, to function as connection destination management means for maintaining, upon transition of a position in the virtual space associated with the user terminal from inside a partial space which is managed by a space management server to inside a partial space which is managed by another space management server, communication connection with the user terminal while the other space management server is executing a process relating to the transition, and changing a transmission destination of data received from the user terminal to the other space management server according to the transition.

BRIEF DESCRIPTION OF THE DRAWINGS

In the accompanying drawings:

FIG. 9 is a diagram illustrating an example of a connection destination management table; and FIG. 10 is a diagram illustrating an example of a communication band management table.

DETAILED DESCRIPTION OF THE INVENTION

An embodiment of the present invention is described in detail below with reference to the accompanying drawings.

A virtual space management system 1 according to this embodiment manages one virtual space or a plurality of virtual spaces. The virtual space is a space where, for example, a multi-participant type on-line game is realized, and may be a two-dimensional or three-dimensional space. Each user of the virtual space management system operates their own user terminal to access the virtual space management system according to this embodiment over a communication network such as the Internet, and participate in one virtual space. Specifically, when a user participates in a virtual space, a position associated with the user terminal used by the user (hereinafter referred to as "user position") is set in the virtual space. For example, the user position may be the position where an object corresponding to the user (user object) is arranged, or the position of a view point set in the virtual space for displaying an image indicating a state in the virtual space on the user terminal. The virtual space management system according to this embodiment moves the user position in the virtual space according to the user's instructional operation on the user terminal and presents a user with sounds or an image indicating a state in the virtual space by transmitting information on various events which occur in the virtual space to the user terminal. This allows the user to play a game which is realized in the virtual space, or experience various events which occur in the virtual space.

Figure 1:
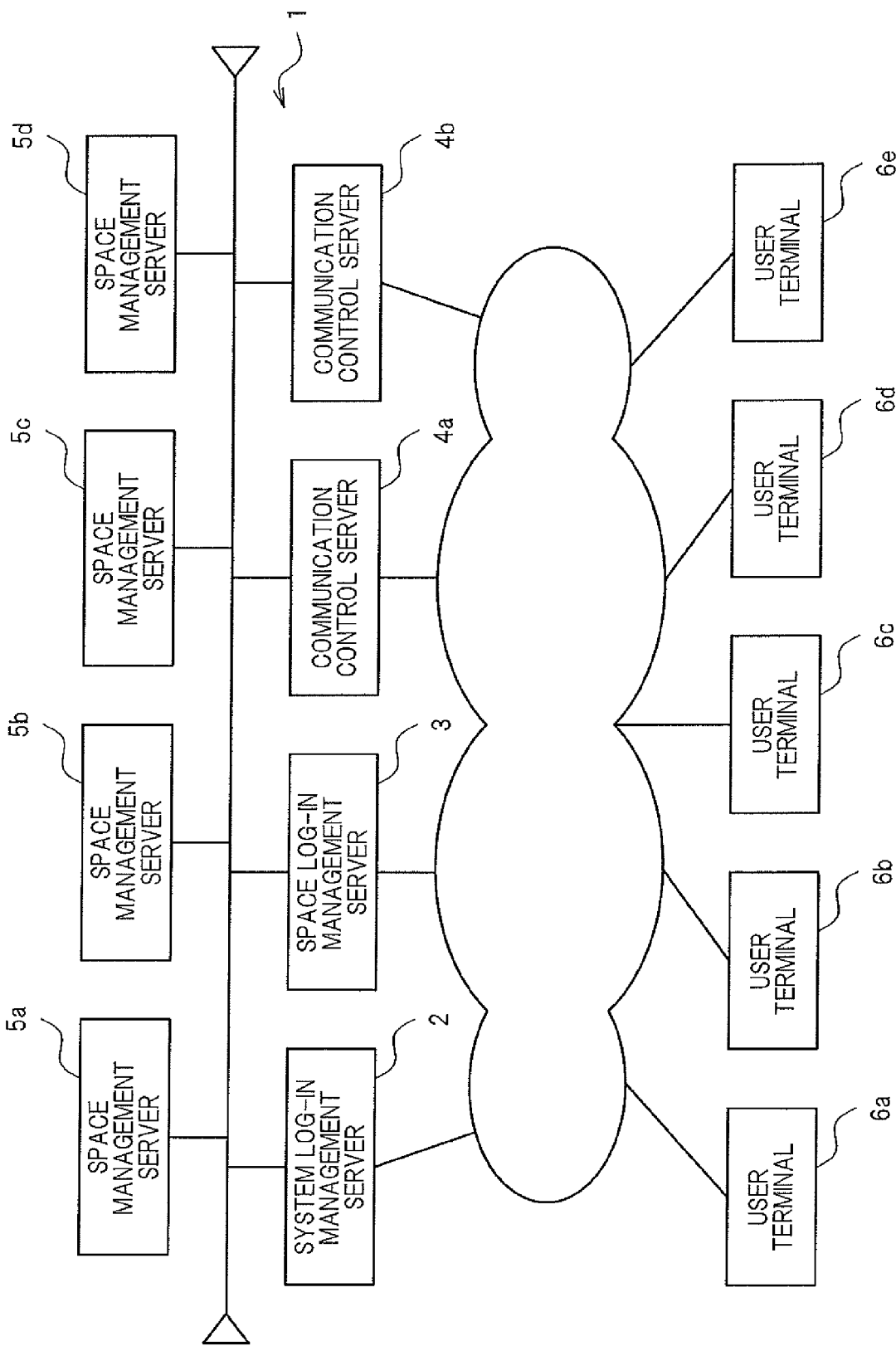
FIG. 1 is an outline diagram illustrating a general outline of a virtual space management system according to an embodiment of the present invention.

FIG. 1 is an outline diagram illustrating a general outline of the virtual space management system 1 according to this embodiment. As illustrated in the diagram, the virtual space management system 1 includes a system log-in management server 2, a space log-in management server 3, a plurality of communication control servers 4, and a plurality of space management servers 5. Those servers each include an information processing apparatus like a server computer, and are connected to one another over a communication network. A plurality of user terminals 6 which are used by respective users of the virtual space management system 1 are connected to the virtual space management system 1 over a communication network such as the Internet. The user terminal 6 is an information processing apparatus, such as a consumer game machine or a personal computer. It is assumed in this embodiment that the communication control servers 4 are connected to the space management servers 5 over a communication network, such as a LAN in a center, having a larger communication band than the communication band of the communication network which connects the user terminals 6 to the communication control servers 4.

The system log-in management server 2 performs the general log-in management of the virtual space management system 1. When a user starts using the virtual space management system 1, the user first operates the user terminal 6 to access the system log-in management server 2 for user authentication by the system log-in management server 2.

The space log-in management server 3 is provided for each virtual space which is managed by the virtual space management system 1, and manages the participation (log-in) of the user in the corresponding virtual space. In FIG. 1, there is one virtual space to be managed by the virtual space management system 1, and there is one space log-in management server 3. However, the virtual space management system 1 may be configured to be able to manage a plurality of virtual spaces.

In this case, a single space log-in management server 3, one or a plurality of communication control servers 4, and one or a plurality of space management servers 5 are provided for each virtual space.

The user who is authenticated by the system log-in management server 2 selects a virtual space in which the user is to participate from one or a plurality of virtual spaces which are managed by the virtual space management system 1. According to the selection, the user terminal 6 used by the user transmits a request to participate in the virtual space to the space log-in management server 3 corresponding to the selected virtual space. The space log-in management server 3 authenticates the user who has made the participation request, determines whether or not to permit the participation, and notifies the user terminal 6 of the determination result.

The communication control server 4 is associated with any one of the virtual spaces which are managed by the virtual space management system 1, and controls communication with the user terminals 6 used by users who are participating in the associated virtual space. Specifically, the communication control server 4 establishes communication connection with a user terminal 6 participating in the corresponding virtual space, and relays communication between the user terminal 6 and the space management server 5 that manages the virtual space in which the user terminal 6 participates. A plurality of user terminals 6 which participate in the same virtual space can communicate and connect with the communication control server 4. The communication control server 4 is communicably connected to one space management server 5 or each of a plurality of space management servers 5 which manage the corresponding virtual space.

In the case of permitting a participation request from a user terminal 6, the above-mentioned space log-in management server 3 notifies the user terminal 6 of information specifying one of the communication control servers 4 corresponding to the participation-requested virtual space. When there are a plurality of communication control servers 4 corresponding to the virtual space, the space log-in management server 3 manages the number of user terminals 6 assigned to each communication control server 4, and notifies the user terminal 6 which has newly made a participation request of information specifying a communication control server 4 having fewer user terminals 6 currently assigned thereto (i.e., communication control server 4 having a lighter processing load than the other communication control servers 4).

In response to the notification, the user terminal 6 issues a connection request to the communication control server 4 which is specified by the notified information to establish communication connection with the communication control server 4. That is, both of the user terminal 6 and the communication control server 4 specify each other as the communication party or destination, and execute an initialization process (session initiation process) to always maintain the data transmittable/receivable state therebetween. After the communication connection is established, the communication connection between the user terminal 6 and the communication control server 4 is maintained while the user terminal 6 is participating in the virtual space, and hence the user terminal 6 performs communication with the space management server 5 which manages the virtual space in which the user terminal 6 is participating, via the communication control server 4.

The space management server 5 is associated with any one of the virtual spaces managed by the virtual space management system 1, and manages the associated virtual space. When there are a plurality of space management servers 5 corresponding to one virtual space, each space management server 5 manages any associated one of a plurality of partial spaces obtained by dividing one virtual space. Specifically, according to this embodiment, one virtual space to be managed by the virtual space management system 1 is divided into a plurality of partial spaces, to each of which the space management server 5 that manages objects arranged in the associated partial space and events which occur therein is assigned. The space management server 5 manages the behavior of each object in the associated partial space, and executes processes relating to various events which occur in that partial space (various events which occur in the virtual space as a result of interactions between objects or instructions or the like from participating users).

Figure 2:
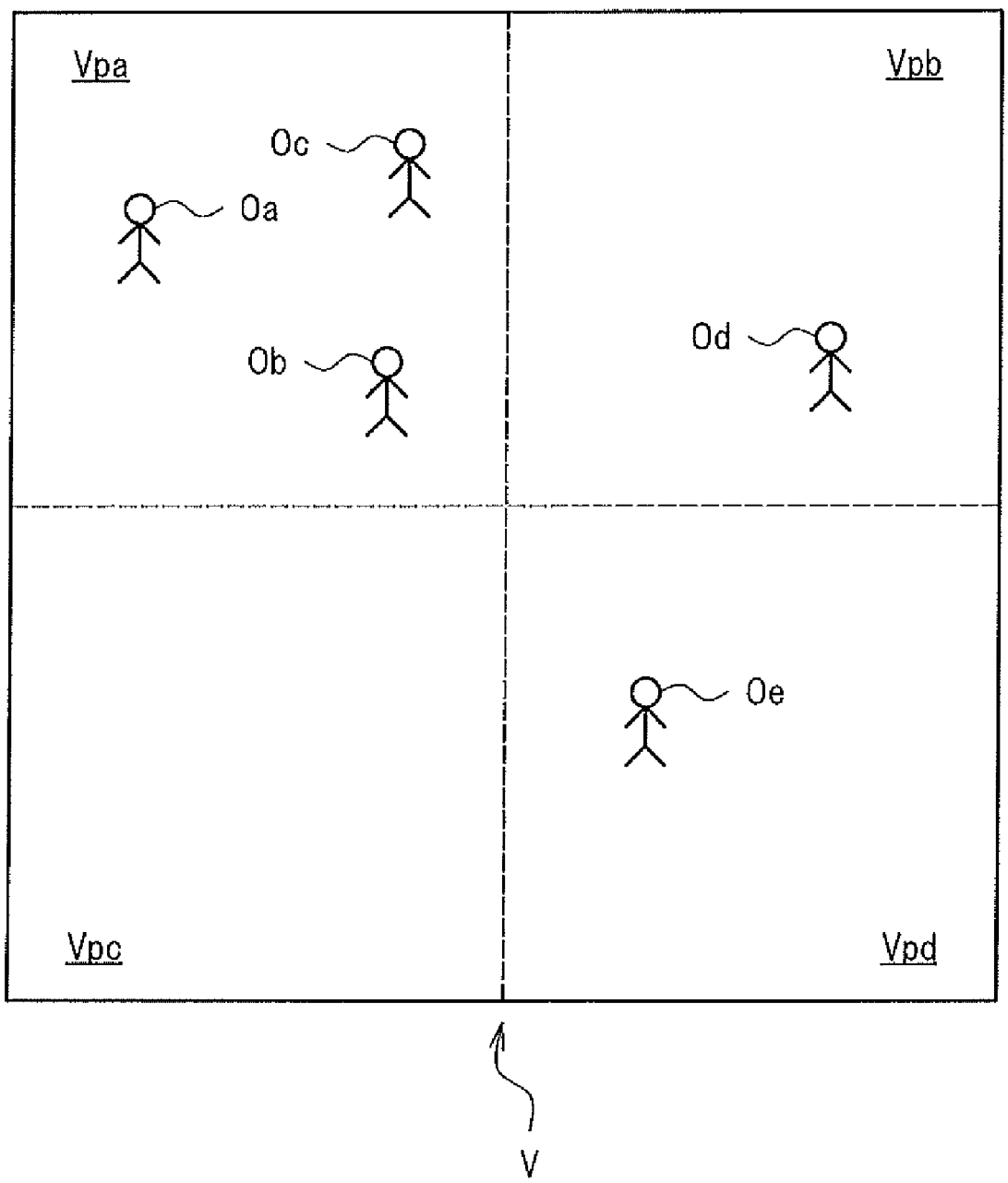
FIG. 2 is a conceptual diagram of a virtual space which is managed by the virtual space management system according to the embodiment of the present invention.

FIG. 2 is a conceptual diagram of a virtual space V which is managed by the virtual space management system 1. In the illustrated example, the virtual space V is divided into four partial spaces Vpa, Vpb, Vpc and Vpd, and each of user objects corresponding to the respective users participating in the virtual space V is located in any one of the four partial spaces Vp. The space management servers 5 which respectively manage the partial spaces Vpa, Vpb, Vpc and Vpd are denoted as space management servers 5a, 5b, 5c and 5d hereinafter. Users who are participating in the virtual space V are denoted by users Ua, Ub, Uc, Ud and Ue, and the user terminals 6 which are used by those users U are denoted by user terminals 6a, 6b, 6c, 6d and 6e. Further, user objects respectively corresponding to the users are denoted by user objects Oa, Ob, Oc, Od and Oe. In this embodiment, the locations of those user objects O in the virtual space V correspond to user positions associated with the respective user terminals 6. The user terminals 6a, 6b and 6c are communicably connected to a communication control server 4a while the user terminals 6d and 6e are communicably connected to a communication control server 4b.

The following describes a specific example of the functions which are realized by the virtual space management system 1 according to this embodiment while a user U is participating in the virtual space V.

To begin with, a general outline of the process that is executed by the virtual space management system 1 will be described. When the user U operates the user terminal 6 to give an instruction while participating in the virtual space V, the user terminal 6 transmits information according to the contents of the instruction operation (hereinafter referred to as "user message") to the communication control server 4 communicably connected. For example, a user message may be information instructing the current coordinate values, the moving direction, the moving speed or the like of the user object O, or may be information instructing the user object O to make various motions. Each communication control server 4 transmits a user message, transmitted from the user terminal 6, to the space management server 5 which manages the partial space Vp to which the user object O corresponding to the user terminal 6 belongs. The space management server 5 outputs event information to be notified to each associated user terminal 6 based on the user message transmitted from the user terminal 6 associated with each user object O present in the partial space Vp which is managed by the local space management server 5, information acquired by calculating the behavior of each object located in the partial space Vp managed by the local space management server 5, or the like. The event information output from the space management server 5 is transmitted to each user terminal 6 via the associated communication control server 4. The user terminal 6 which has received the event information updates an image to be displayed on the monitor, or reproduces sounds from a loudspeaker according to the contents of the event information. When such processing is executed continuously, each user U can manipulate a user object O in the virtual space V and experience various events which occur in the virtual space V.

Figure 3:
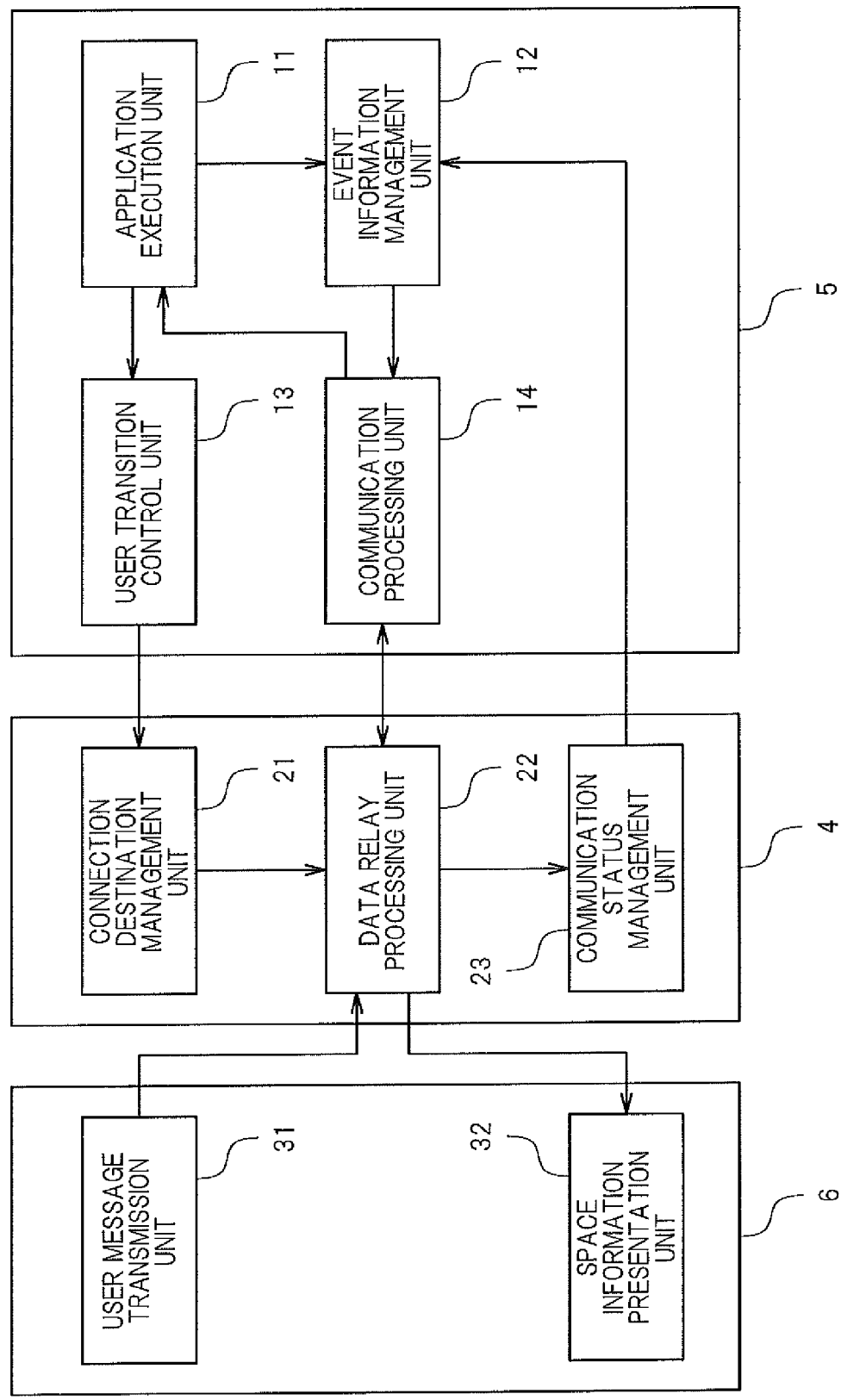
FIG. 3 is a functional block diagram exemplifying functions which are achieved by the virtual space management system according to the embodiment of the present invention.

FIG. 3 is a functional block diagram specifically exemplifying functions which are achieved by the virtual space management system 1 according to this embodiment. As illustrated in the diagram, the space management server 5 functionally includes an application execution unit 11, an event information management unit 12, a user transition control unit 13 and a communication processing unit 14. The communication control server 4 functionally includes a connection destination management unit 21, a data relay processing unit 22 and a communication status management unit 23. The user terminal 6 functionally includes a user message transmission unit 31 and a space information presentation unit 32. All of the functions are achieved when the control unit (program control device such as a microprocessor) equipped in each of the space management server 5, the communication control server 4 and the user terminal 6 executes a program stored in a storage unit (e.g., a memory device such as RAM). Those programs may be supplied to the individual apparatuses over a communication network such as the Internet, or may be supplied as programs stored on various kinds of computer readable information storage media such as an optical disc.

The application execution unit 11 of the space management server 5 is realized when the control unit executes a game application program or the like which realizes the virtual space V. The contents of the process which is executed by the application execution unit 11 define what kind of object is located in the partial space Vp managed by the space management server 5 and what event occurs in the partial space Vp.

Specifically, the application execution unit 11 receives a user message sent from each user terminal 6 by the user message transmission unit 31 to be described later. Then, the application execution unit 11 determines a change in status of each object located in the partial space Vp (position and direction, moving speed and moving direction of each object in the partial space, and other parameters) based on the received user message, the various predetermined event conditions and so on. As the status of each object changes per unit time, each object demonstrates various behaviors in the partial space Vp with time. Objects to be targets whose status changes are to be determined may include not only a user object O but also other character objects or the like. At the time of determining a change in status of each object, predetermined decision conditions may be used, or the result of executing a physical simulation or the like may be used.

Further, the application execution unit 11 outputs event information indicating the above-mentioned change in status of each object and various events which occur in the partial space Vp to the event information management unit 12. The event information is various kinds of information about the partial space Vp which are to be transmitted to the user terminal 6 by the space management server 5. The application execution unit 11 may designate a specific user terminal 6, or the location of occurrence of the event information (position of an object whose status has changed, or the like) and a predetermined range including its periphery (hereinafter referred to as "peripheral range") as the notification destination of the event information.

Figures 4, 5:
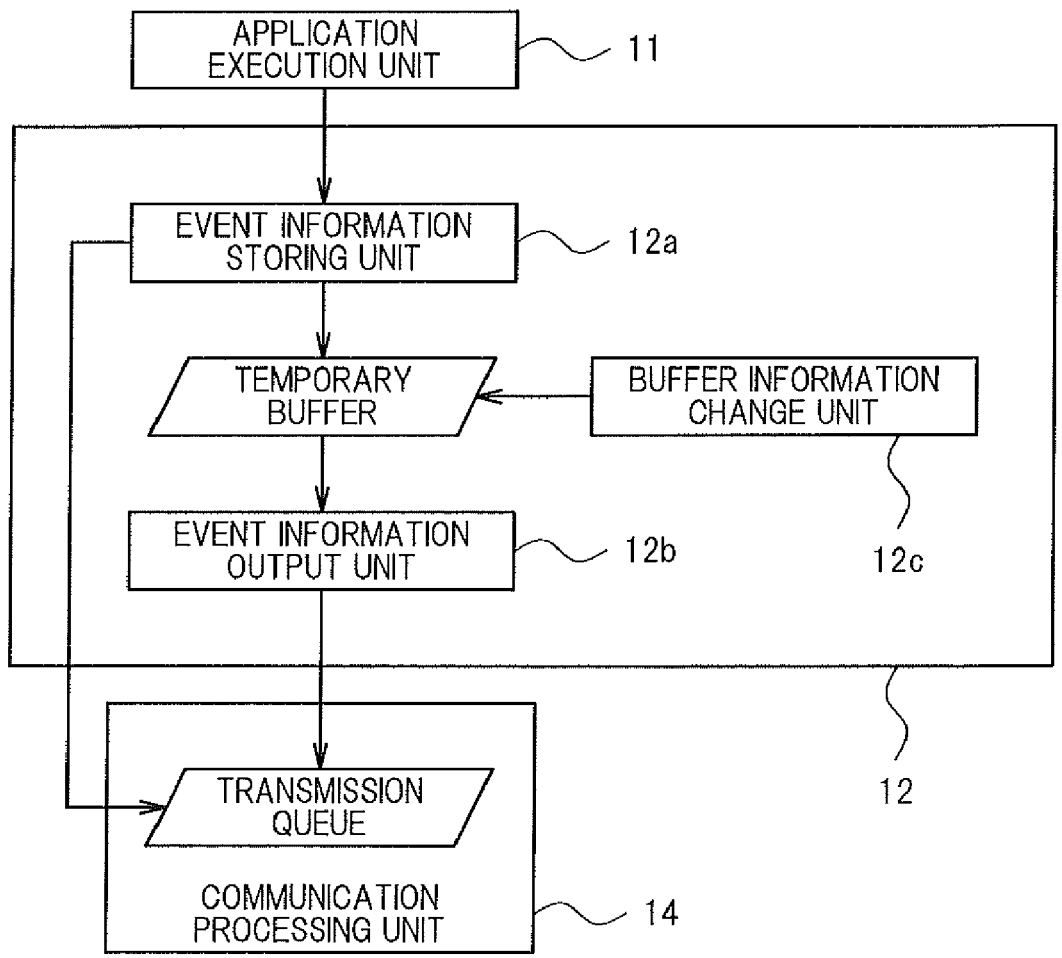
FIG. 4 is a functional block diagram exemplifying functions of an event information management unit.
FIG. 5 is a diagram illustrating an example of a temporary buffer.

The event information management unit 12 of the space management server 5 manages event information output from the application execution unit 11. According to this embodiment, the event information management unit 12 functionally includes an event information storing unit 12a, an event information output unit 12b and a buffer information change unit 12c, as illustrated in FIG. 4.

The event information storing unit 12a stores a plurality of items of event information output from the application execution unit 11 in a predetermined buffer area (hereinafter referred to as "temporary buffer") in the storage unit in a manner that specifies the transmission order of the individual event information items. The transmission order of the individual items of event information is defined by the application execution unit 11. As a specific example, event information may be stored in the temporary buffer in order of transmission from the application execution unit 11, and the transmission order of the individual event information items may be specified in the order in which they are stored. Alternatively, the application execution unit 11 may output the event information with information specifying the transmission order in such a way that the transmission order of the event information differs from the order of outputting the event information to the event information storing unit 12a. A specific example of this case will be described later. The temporary buffer is secured for each user terminal 6 which is the transmission destination of event information, and the event information management unit 12 stores each item of event information in the temporary buffer associated with the transmission destination user terminal 6. FIG. 5 illustrates an example of such a temporary buffer, and represents each item of event information, stored in the temporary buffer of each user terminal 6, with a circle.

When the application execution unit 11 designates the peripheral range of an event-occurred location as the notification destination of event information, the event information management unit 12 specifies the notification destination of the event information as follows. That is, the partial space Vp which is managed by each space management server 5 is further divided into predetermined unit regions (hereinafter referred to as "grids"), and the event information management unit 12 manages to which grid each user object O present in the partial space Vp belongs. When receiving event information to be transmitted to the peripheral range, the event information management unit 12 determines whether or not the user object O is present inside a grid to which the location of occurrence of the event information belongs and adjoining grids around the grid. If the user object O is present in such a grid, the user terminal 6 associated with the user object O is determined as the transmission destination of the event information.

Figures 6, 7:
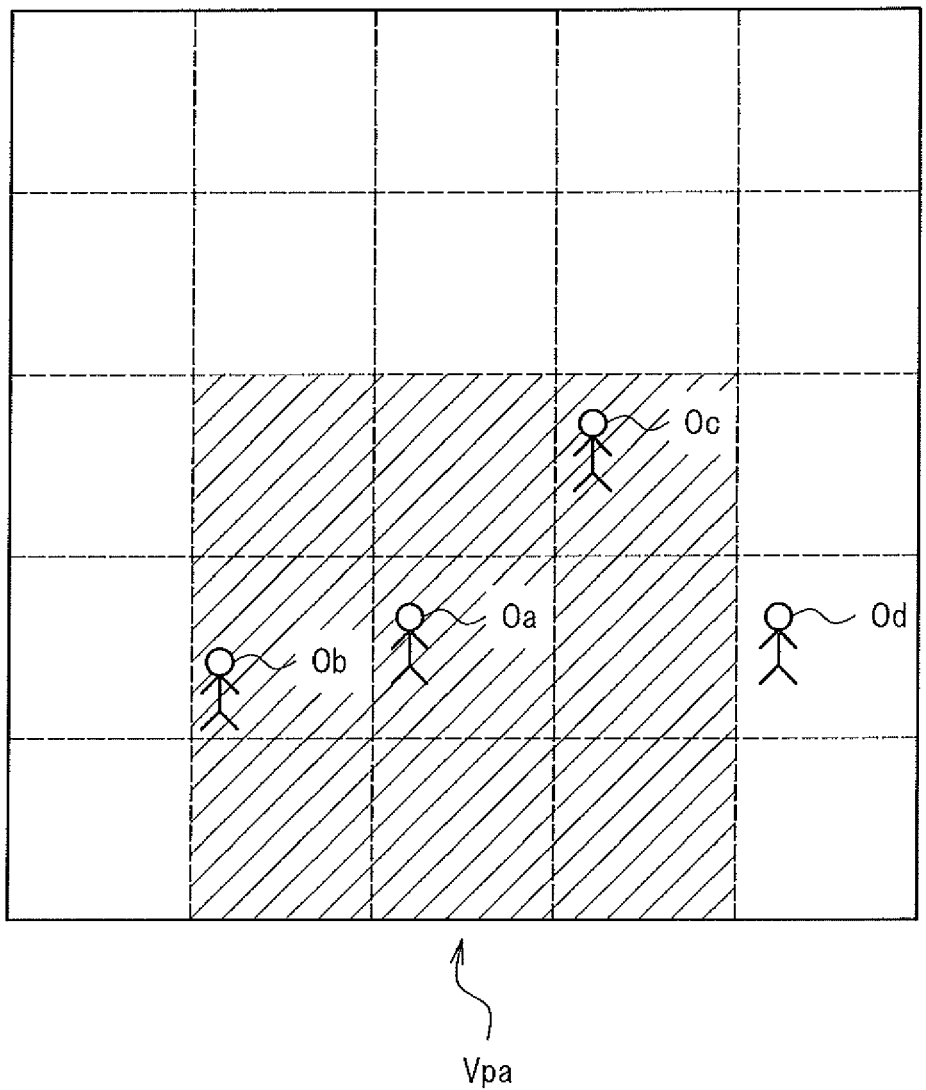
FIG. 6 is an explanatory diagram illustrating a peripheral range to which event information is to be transmitted.
FIG. 7 is a diagram illustrating an example of a transmission queue.

FIG. 6 is an explanatory diagram illustrating a peripheral range to which event information is to be transmitted. In the illustrated example, broken lines represent the boundaries of individual grids, and the partial space Vpa is divided into a total of twenty-five grids in a 5×5 matrix. Suppose that the application execution unit 11 generates event information indicating a change in status of the user object Oa, designating the peripheral range as the notification destination. At this time, the peripheral range to be the notification destination of the event information contains a total of nine grids in a 3×3 matrix which are indicated by hatches in the diagram. In addition to the user object Oa, the user object Ob and the user object Oc are present in the peripheral range. Therefore, the event information management unit 12 determines the user terminals 6a, 6b and 6c as the notification destinations of the event information, and stores the event information in the temporary buffers associated with the respective user terminals 6. The user object Od is not included in the peripheral range, and hence it is not the notification destination of event information. When the event information management unit 12 specifies the user object O which belongs to the peripheral range as the notification destination of event information, the application execution unit 11 can notify only those user terminals 6 which are likely to be affected by the event information of event information by merely instructing notification of event information to the peripheral range and without individually designating each notification destination of the event information.

When the location of occurrence of event information is a grid positioned at an end of the partial space Vp, the peripheral range of the grid includes a grid belonging to another adjoining partial space Vp. In such a case, the event information management unit 12 notifies the space management server 5 which manages another adjoining partial space Vp of event information. The event information management unit 12 of another space management server 5 which has received the event information determines whether or not the user object O is present in a grid adjoining the location of occurrence of the notified event information. When the user object O is present there, the event information management unit 12 stores the notified event information in the temporary buffer of the user terminal 6 associated with the user object O.

The event information output unit 12b reads out a plurality of event information items, stored in the temporary buffer by the event information storing unit 12a, in the specified transmission order, and writes the event information in a predetermined transmission queue. The event information written in the transmission queue is deleted from the temporary buffer. The transmission queue, unlike the temporary buffer, is secured in the storage unit for each communication control server 4 which is the actual transmission destination of event information. Therefore, the event information output unit 12b specifies which communication control server 4 is connected to each user terminal 6 by referring to a table indicating the correlation between the user terminals 6 and the communication control servers 4 and stored in the storage unit. Then, the event information output unit 12b stores event information associated with each user terminal 6 in the transmission queue associated with the communication control server 4 connected to the user terminal 6. FIG. 7 illustrates an example of such a transmission queue, and represents each item of event information, stored in the transmission queue, with a circle as in FIG. 5.

The buffer information change unit 12c changes information stored in the temporary buffer in response to a request from the application execution unit 11. This allows event information prior to storage thereof in the transmission queue to be deleted or updated as needed, or allows the transmission order of individual event information items to be reviewed.

The user transition control unit 13 of the space management server 5 executes a process relating to a transition in which the position of the user object O in the virtual space V transitions from inside one partial space Vp to inside another partial space Vp. Specifically, when the user object O is moved from the partial space Vp which is managed by the local space management server 5 to the partial space Vp which is managed by another space management server 5 in response to a user's instruction or the like, the user transition control unit 13 executes a process of transferring information on the user object O to the other space management server 5. When the user object O enters the partial space Vp which is managed by the local space management server 5 from the partial space Vp which is managed by another space management server 5, the user transition control unit 13 executes a user object receiving process for receiving information on the newly entered user object O from the other space management server 5.

The communication processing unit 14 of the space management server 5 executes transmission and reception of data to and from the communication control server 4. Specifically, the communication processing unit 14 outputs a user message, transmitted from each communication control server 4, to the application execution unit 11. The communication processing unit 14 manages the transmission queue, and sequentially transmits event information, written in the transmission queue by the event information output unit 12b, to the communication control server 4. The transmission queue is a memory area for storing data which has already been in a communication queue state, and hence data is stored in the first-in-first-out (FIFO) mode. The communication processing unit 14 does not update data stored in the transmission queue or change the order of the data.

The connection destination management unit 21 of the communication control server 4 manages to which partial space Vp managed by which space management server 5 the user object O associated with each user terminal 6 communicably connected to the local communication control server 4 belongs. Specifically, the connection destination management unit 21 generates a connection destination management table associating each user terminal 6 connected to the local communication control server 4 with the space management servers (connection destination space management server 5) which manages the partial space Vp to which the user object O associated with this user terminal 6 belongs, and updates information in the table according to the notification from the user transition control unit 13.

The data relay processing unit 22 of the communication control server 4 relays transmission and reception of data between the user terminal 6 and the space management server 5 which manages the partial space Vp to which the user object O associated with this user terminal 6 belongs. Specifically, when receiving a user message from the user terminal 6 communicably connected to the local communication control server 4, the data relay processing unit 22 specifies the space management server 5 corresponding to this user terminal 6 by referring to information managed by the connection destination management unit 21, and stores the received user message in that of server-oriented transmission queues prepared for the respective space management servers 5, which corresponds to the specified space management server 5. Then, the data relay processing unit 22 sequentially transmits user messages, stored in the server-oriented transmission queues, to the communication processing unit 14 of the corresponding space management server 5.

When receiving event information specifying the notification destination user terminal 6 from the communication processing unit 14 of each space management server 5, the data relay processing unit 22 stores the received event information in user-terminal-oriented transmission queues prepared for the respective user terminals 6 at the transmission destination. Then, the data relay processing unit 22 sequentially transmits the event information, stored in the user-terminal-oriented transmission queues, to the space information presentation unit 32 of the corresponding user terminal 6.

The communication status management unit 23 of the communication control server 4 monitors the statuses of transmission and reception of data to and from each user terminal 6 by the data relay processing unit 22, and notifies the event information management unit 12 of the space management server 5 of acquired information. The notified information on the statuses of transmission and reception of data is used at the time when the event information output unit 12b in the event information management unit 12 carries out the process of outputting event information.

The user message transmission unit 31 of the user terminal 6 accepts an instruction operation of an operation device or the like of the user terminal 6, which is performed by the user, and outputs information relating to the instruction operation to the data relay processing unit 22 of the communication control server 4 as a user message. The space information presentation unit 32 of the user terminal 6 receives event information transmitted from the data relay processing unit 22 of the communication control server 4, and updates an image representing the state in the virtual space V or reproduces sounds from the loudspeaker according to the received event information.

Next, some specific examples of the processes to be executed by the above-mentioned individual units will be described.

Figure 8:
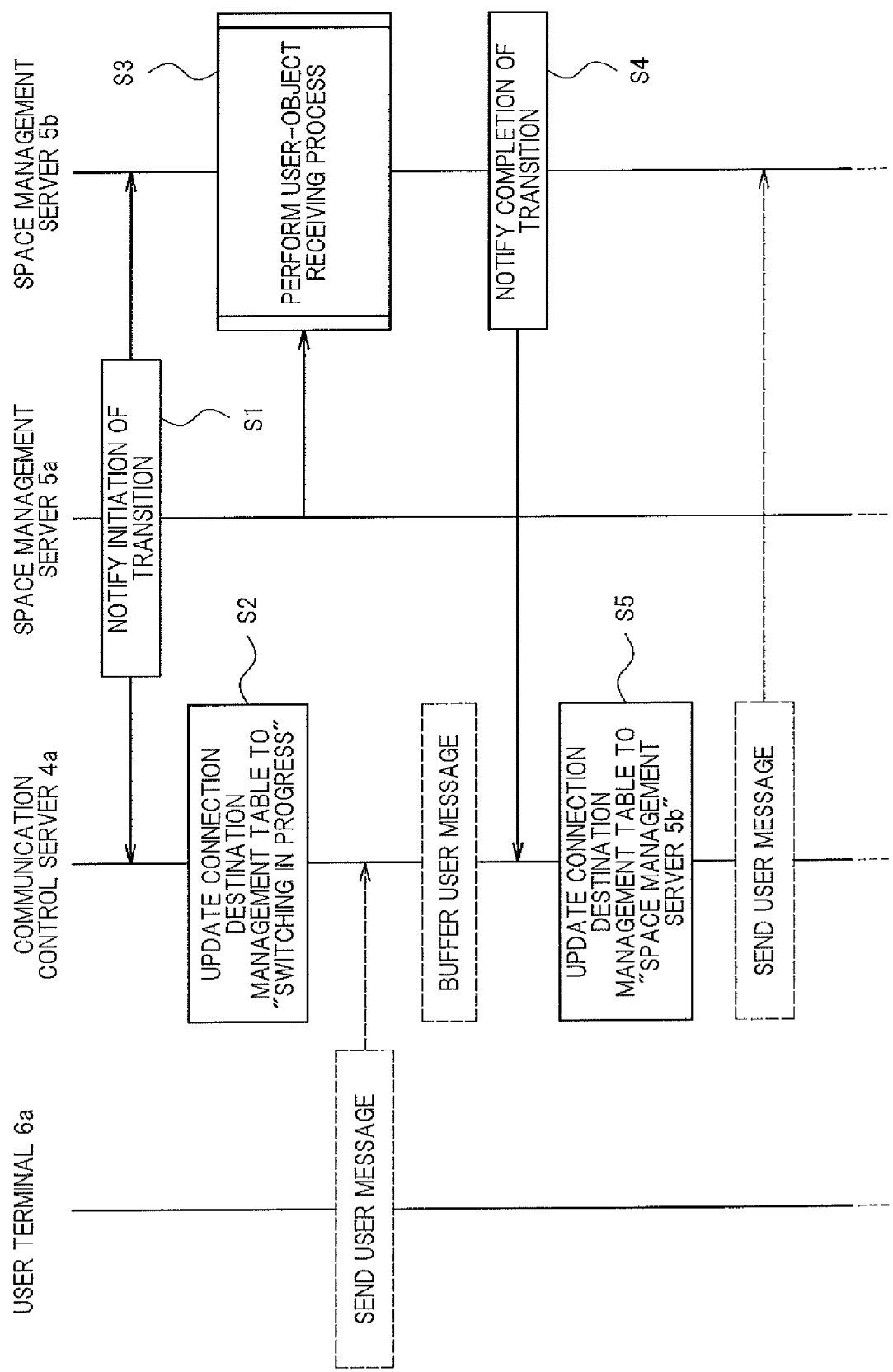
FIG. 8 is a flow chart illustrating an example of a process which is executed at the time of transition of a user object.

First, a description will be given of processing when the position of the user object O transitions from one partial space Vp to another partial space Vp, referring to a flow chart of FIG. 8. The following describes, as an example, a case where the user object Oa present in the partial space Vpa is moved into the partial space Vpb in response to a user's instruction.

When being notified of the motion of the user object Oa from the partial space Vpa to the partial space Vpb from the application execution unit 11, the user transition control unit 13 of the space management server 5a which manages the partial space Vpa specifies the space management server 5b which manages the partial space Vpb, and notifies the space management server 5b and the communication control server 4a connected with the user terminal 6a of the initiation of the transition of the user object Oa (S1).

The connection destination management unit 21 of the communication control server 4a which has received the notification of the initiation of the transition in S1 updates information indicating the space management server 5 to which the user terminal 6a is connected to information indicating "switching in progress" in the connection destination management table (S2). FIG. 9 is a diagram illustrating an example of the connection destination management table which has undergone such an update.

Meanwhile, the user transition control unit 13 of the space management server 5b which has received the notification of the initiation of the transition in S1 executes a user-object receiving process as a process relating to the transition (S3). The user-object receiving process includes a process to receive information on the user object Oa from the user transition control unit 13 of the space management server 5a, to place the user object Oa in the partial space Vpb, and to enable transmission of event information and reception of user messages to and from the user terminal 6a. The information on the user object O which is the reception target in the user-object receiving process includes user specifying information (user ID or the like) which specifies a user associated with the user object O, and information indicating the position of the transitioned user object O in the virtual space V. The user specifying information specifies the user terminal 6 which the user uses and the communication control server 4 at the connection destination of that user terminal 6. In addition, the information on the user object O of the reception target may include information on the moving direction, the moving speed and so forth of the user object O. Further, the user transition control unit 13 of the space management server 5 before transition may acquire various kinds of information relating to the type and state of the user object O by inquiring the application execution unit 11 about the information, and may give the acquired information to the space management server 5 after the transition as part of the information on the user object O.

During execution of the user-object receiving process, when an event to be notified to the user terminal 6a has occurred (e.g., when an event has occurred around the grid to which the user object Oa belongs last), the event information management unit 12 of the space management server 5a transfers the event information to the event information management unit 12 of the space management server 5b, not to the communication control server 4a. The event information storing unit 12a of the space management server 5b stores the transferred event information in the temporary buffer as in the case of the event information output from the application execution unit 11 of the space management server 5b. It is to be noted that the event information output unit 12b does not output event information stored in the temporary buffer corresponding to the user terminal 6a to the transmission queue, but keeps the event information stored in the temporary buffer until the user-object receiving process in S3 is completed.

When receiving a user message from the user message transmission unit 31 of the user terminal 6a during execution of the user-object receiving process in S3, the data relay processing unit 22 of the communication control server 4a secures a received-event buffer in association with the user terminal 6a, buffers the received user message in the received-event buffer, and withholds data transmission because the information associated with the user terminal 6a is "switching in progress" in the connection destination management table. Process flows indicated by broken lines of FIG. 8 represent a case where such a process has occurred.

When the user-object receiving process in S3 is completed, the user transition control unit 13 of the space management server 5b notifies the connection destination management unit 21 of the communication control server 4a of the completion of the process (i.e., completion of the transition of the user position) (S4).

The connection destination management unit 21 of the communication control server 4a which has received the notification of the completion of the transition in S4 updates information indicating the space management server 5 to which the user terminal 6a is connected to information indicating the space management server 5b which has transmitted the notification in the connection destination management table (S5). Accordingly, the transition of the user object Oa from the partial space Vpa to the partial space Vpb is completed, after which transmission and reception of a user message and event information are carried out between the user terminal 6a and the space management server 5b via the communication control server 4a.

When the transition is completed, first, the data relay processing unit 22 of the communication control server 4a transfers the user messages, received from the user terminal 6a and stored in the received-event buffer during execution of the user-object receiving process, to the server-oriented transmission queue corresponding to the space management server 5b, and sequentially transmits the user messages to the space management server 5b. The event information output unit 12b of the space management server 5b outputs event information, stored in the temporary buffer by the event information storing unit 12a during execution of the user-object receiving process and to be transmitted to the user terminal 6a, to the transmission queue as the transmission target to the communication control server 4a.

The above-mentioned process relating to the transition of the user object Oa is carried out with every communication connection being kept between the user terminal 6a and communication control server 4a, between the communication control server 4a and space management server 5a, and between the communication control server 4a and space management server 5*b*. This method achieves the transition of the user object O without disconnecting or reconnecting the communication connection between any apparatuses, thereby making it possible to shorten the period of time needed for the transition of the user object O. If each user terminal 6 always establishes communication connection with a single communication control server 4 alone while participating in the virtual space V, the user terminal 6, no matter which partial space Vp it moves to, can exchange a user message and event information with the space management server 5 which manages the partial space Vp at the moving destination due to the relay of the communication control server 4.

The communication control server 4*a* buffers the user message during execution of the transition of the user object O*a*, and hence the user terminal 6*a* can have the process executed by the user message transmission unit 31 and keep sending the user message even during execution of the transition, as was done before the transition. Event information which has occurred near the user object O*a* in both the space management servers 5*a* and 5*b* is also stored in the temporary buffer of the space management server 5*b* during execution of the transition, and is transmitted to the user terminal 6*a* after the transition is completed. Accordingly, a user message about the user operation executed during execution of the transition, and event information which has occurred in the virtual space V during execution of transition are transmitted to the space management server 5*b* and the user terminal 6*a* without disappearing. According to this embodiment, as described above, the communication band of the communication network between the communication control server 4*a* and the space management server 5*b* is wider than the communication band of the communication network between the user terminal 6*a* and the communication control server 4*a*. Therefore, when the execution of transmission of a user message to the communication control server 4*a* from the user terminal 6*a* is enabled, even during execution of the transition process, communication which takes a relatively long period of time can be prevented from being interrupted by the transition process. That is, according to this embodiment, if the user message has reached the communication control server 4*a*, the user message can be transmitted to the space management server 5*a* from the communication control server 4*a* in a relatively short period of time after the transition process is completed, thus making it possible to shorten the time lag from a user's instruction operation to the arrival of the user message originated from the instruction operation at the space management server 5*a*, compared with the case where the user terminal 6*a* starts transmitting the user message only after the transition process is completed.

The description above has been given of the example case where movement of the user object O*a* itself in the virtual space V causes the transition from the partial space Vp*a* to the partial space Vp*b*, but a process similar to the above-mentioned process may be executed even when the transition of the user object O takes place due to other causes. For example, the range of the partial space Vp which is managed by the space management server 5 may be dynamically changed according to this embodiment. That is, when user objects O are concentrated on one partial space Vp, for example, the user transition control unit 13 transfers part of the partial space Vp grid by grid, along with objects positioned in the grid, to the space management server 5 which manages the adjoining partial space Vp. This allows the space management servers 5 to adjust the loads so that the loads are not concentrated on a specific space management server 5.

In this case, it is assumed that each space management server 5 regularly exchanges information on the load status with other space management servers 5. When the processing load becomes higher as the number of user objects O belonging to the partial space Vp which is managed by the local space management server 5 exceeds a predetermined number or so, part of the partial space Vp is transferred grid by grid to the space management server 5 with a relatively low processing load, among those space management servers 5 which manage adjoining other partial spaces Vp. At this time, the space management server 5 first transmits information on the transfer target grid to the space management server 5 at the transfer destination, and then executes the above described transition processes for user objects O present in the grid, in order. This also allows the grid transfer process to be executed without interrupting the processing of the user terminal 6.

Next, a specific example of event information management by the event information management unit 12 will be described.

According to this embodiment, the event information output unit 12*b* adjusts the amount of data of event information per unit time to be transmitted to the communication control server 4 by outputting the event information to the transmission queue according to the communication environment between the communication control server 4 and the user terminal 6. Specifically, the event information output unit 12*b* varies the amount of data to be output per unit time to the transmission queue from the temporary buffer corresponding to each user terminal 6 according to the amount of data which the communication control server 4 can transmit per unit time to that user terminal 6. The amount of data transmittable per unit time to the user terminal 6 by the communication control server 4 may be specified by, for example, information about the network environment, such as the communication band of each user terminal 6, obtained by the communication control server 4 from each user terminal 6. In addition, the amount of data may be estimated according to the amount of data which the communication control server 4 has transmitted to the user terminal 6 per unit time in the past. A specific example in this case is described below.

Specifically, the communication status management unit 23 of the communication control server 4 regularly measures the available maximum communication band (maximum transmittable and receivable amount of data per unit time) for each user terminal 6 and space management server 5 connected to the local communication control server 4. Further, the communication status management unit 23 regularly measures the actual use communication band (amount of data actually transmitted and received per unit time) in a predetermined period of time in the most recent past. Those information items are measured every several seconds to every several minutes, for example, and are notified to the event information output unit 12*b* of the space management server 5. Note that the maximum communication band or use communication band for the user terminal 6 is to be notified to the space management server 5 recorded as the connection destination of the user terminal 6 in the connection destination management table. Accordingly, the event information output unit 12*b* of each space management server 5 regularly acquires and records information to be stored in a communication band management table as exemplified in FIG. 10.

The event information output unit 12*b* determines the amount of data to be read out from the temporary buffer and output to the transmission queue per unit time by referring to the information stored in the communication band management table. That is, the user terminal 6 whose use communication band has a large value can transmit a large amount of data, and hence the amount of data to be transferred to the transmission queue per unit time is increased according to the value. It is to be noted that data whose amount exceeds the value of the maximum communication band cannot be transmitted even in the case of increasing the amount of data, and hence the amount of data is increased with the value of the maximum communication band being the upper limit. For the user terminal 6 whose use communication band has a small value, on the other hand, the amount of transmittable data is limited, and hence the amount of data to be transferred to the transmission queue per unit time is decreased according to the value.

Further, the event information output unit 12b may correct the amount of data of event information to be transferred to the transmission queue from the temporary buffer according to the amount of data remaining in the user-terminal-oriented transmission queue of the communication control server 4. In this case, the communication status management unit 23 of the communication control server 4 measures the amount of data of event information which cannot be transmitted to the user terminal 6 and remains in the user-terminal-oriented transmission queue every time the data relay processing unit 22 executes the process of a single transmission cycle (process of transmitting a transmittable amount of event information in the event information stored in the user-terminal-oriented transmission queue to all the user terminals 6 connected). When the user-terminal-oriented transmission queue is empty, a request for increasing the amount of transmission data to the user terminal 6 is output to the event information output unit 12b. In response to the request, the event information output unit 12b performs correction to increase the value of the use communication band in the communication band management table, and transfers event information to the transmission queue from the temporary buffer based on the corrected value. In this case, the corrected value is limited so as not to exceed the value of the maximum communication band. When a predetermined amount or a larger amount of data remains in the user-terminal-oriented transmission queue, the communication status management unit 23 sends a request for decreasing the amount of transmission data to the user terminal 6 to the event information output unit 12b. In response to the request, the event information output unit 12b performs correction to decrease the value of the use communication band in the communication band management table, and transfers event information to the transmission queue from the temporary buffer based on the corrected value.

When the above-mentioned control is carried out, the amount of data of event information to be transmitted to the communication control server 4 from the space management server 5 is adjusted according to the amount of data which has been transmitted to each user terminal 6 from the communication control server 4 in the past. Accordingly, the state of the user-terminal-oriented transmission queue can be controlled in such a way that the user-terminal-oriented transmission queue of the communication control server 4 does not become empty and a large amount of data, unable to be transmitted to the user terminal 6, does not remain in this user-terminal-oriented transmission queue. According to this embodiment, as described above, data in the temporary buffer can be updated by the buffer information change unit 12c. Specifically, the buffer information change unit 12c, for example, deletes event information which need not be transmitted to the user terminal 6 with the progress of the process executed by the application execution unit 11 from the temporary buffer. Therefore, event information which, even when being transmitted to the communication control server 4, cannot be transmitted to the user terminal 6 and is predicted to remain queued in the communication control server 4 for a certain period of time, may not be transmitted to the communication control server 4 and instead be kept stored in the temporary buffer until it becomes transmittable to the user terminal 6. This makes it possible to increase the chances of discarding the event information which has become unnecessary without being transmitted.

Note that each event information may be associated with information designating a valid period and stored in the temporary buffer, and event information which remains in the temporary buffer, even after a period of time equal to or longer than the associated valid period has elapses since generation of the event information by the application execution unit 11, may be a deletion target. Accordingly, event information which stays untransmitted for a long period of time since generation of the event and becomes insignificant can be removed from the transmission target. The deletion of event information whose valid period has expired from the temporary buffer may be carried out when the event information output unit 12b transfers event information stored in the temporary buffer to the transmission queue.

Further, according to this embodiment, the buffer information change unit 12c may not only delete event information stored in the temporary buffer but also change the transmission order of event information or update the contents of event information as requested by the application execution unit 11.

As a specific example, priority information designated by the application execution unit 11 may be associated with each event information to be stored in the temporary buffer as information defining the transmission order of each event information. The application execution unit 11 rewrites the priority information of individual event information items stored in the temporary buffer according to an event which occurs in the virtual space. In response to the rewriting, the buffer information change unit 12c sorts a plurality of event information items stored in the temporary buffer for the respective user terminals 6 according to the priority every predetermined period of time. Accordingly, event information which has a particularly high significance (e.g., event information or the like which has been generated with regard to the user object O corresponding to the transmission target user terminal 6) can be transmitted with priority to the user terminal 6 to which a large amount of data cannot be transmitted because of the limited communication band, while event information which has a low significance (e.g., event information or the like which has been generated at a position far from the user object O corresponding to that user terminal 6) can be left in the temporary buffer. When the virtual space V serves to realize a game, for example, the above-mentioned control allows minimum event information required for the progress of the game to be transmitted with priority to the user terminal 6 with a limited communication band while information or the like which is not directly related to the progress of the game but serves to indicate a more detailed state in the virtual space V can be transmitted to the user terminal 6 with a large communication band. This makes it possible to transmit data whose amount corresponds to the communication capability of each user terminal 6 without spoiling the fairness of the game. With the valid period associated with event information which has a low priority and thus stays untransmitted in the temporary buffer as described above, this event information can be removed from the transmission target and deleted when a period equal to or longer than the valid period elapses.

In this case, the event information storing unit 12a may not store event information which has a particularly high priority and should always be transmitted to the user terminal 6 in the temporary buffer, but may store the event information in the transmission queue directly. This allows event information which fulfills a predetermined condition to be controlled so that it is always transmitted to the user terminal 6 regardless of the data communication status of the user terminal 6.

Event information may be stored in the temporary buffer in association with information specifying the type of an event. In this case, when event information of the same type as that of event information which is to be newly stored in the temporary buffer has already been stored in the temporary buffer in association with the same user terminal 6, the event information storing unit 12a overwrites the stored event information with the new event information. This makes it possible to avoid transmitting event information of the same type, such as event information designating the current position of a specific object, to the user terminal 6 over and over again, and transmit only event information representing the latest state to the user terminal 6, thus reducing wasteful data transmission.

The following describes an example where a chat system is realized by the virtual space management system 1 as an application example of the virtual space management system 1 according to this embodiment. In this example, each user object O can move in the virtual space V and enjoy having a conversation with another nearby user object O. In this example, each user inputs characters for desired speech using an operation device such as a keypad. The user message transmission unit 31 of the user terminal 6 transmits the input text information, together with information relating to the predetermined voice quality of the user, to the communication control server 4 as a user message. Referring to the connection destination management table, the data relay processing unit 22 of the communication control server 4 transmits the user message to the space management server 5 which manages the partial space Vp to which the user object O associated with the user terminal 6 belongs. This user message is output to the application execution unit 11 of the space management server 5 via the communication processing unit 14.

The application execution unit 11 sends the event information management unit 12 text information and information about the voice quality, which are included in the received user message, as spoken event information indicating the speech of the user, with the position of the user object O (speaker) corresponding to the user terminal 6 from which the user message is transmitted being the location of occurrence of an event, and the peripheral range of the location of occurrence of the event being the notification destination. The event information storing unit 12a of the event information management unit 12 stores the spoken event information in the temporary buffer of the user terminal 6 corresponding to each user object O (listener) present in the peripheral range of the location of occurrence of the event. The application execution unit 11 may change the order of priority of the spoken event information stored in the temporary buffer according to the positional relationship between the speaker and listener in the virtual space V. That is, when the distance between the speaker and listener is long, or when the direction of the listener is opposite to the direction of the speaker, for example, the order of priority of the spoken event information for the listener is lowered. This makes it possible to lower the order of priority of the spoken event information which is estimated to be hard for the listener to hear, and transmit other spoken event information which is estimated to be easy for the listener to hear, to the user terminal 6 with priority.

The event information output unit 12b outputs spoken event information in the temporary buffer to the communication processing unit 14, which transmits the spoken event information to the communication control server 4. The data relay processing unit 22 of the communication control server 4 transmits the spoken event information to the user terminal 6. The space information presentation unit 32 of the user terminal 6 performs voice synthesis on the contents of the text information included in the received spoken event information with the voice quality according to the information on the voice quality of the speaker, and reproduces the contents of the speech from a loudspeaker. Accordingly, the content of speech input using text by a user is heard with the voice quality of the user by another nearby user in the virtual space V. In this case, the space information presentation unit 32 may execute control to effect the surround playback using multichannel loudspeakers so that the content of the speech of the speaker are heard from the direction in which the user object O of the speaker is present in the virtual space V with respect to the direction of the user object O of the listener. This allows the user to chat with the feeling of actually having a conversation with another user in the virtual space V.

While the virtual space management system 1 according to the embodiment described above divides one virtual space V into a plurality of partial spaces Vp, and allows the independent space management servers 5 to manage the respective partial spaces Vp, it is unnecessary to change over the communication connection at the time of transition of a user object O from inside one partial space Vp to inside another partial space Vp, and it is possible to achieve the transition quickly without interrupting the processing of the user terminal 6.

The virtual space management system 1 according to this embodiment adjusts the amount of data to be transmitted per unit time to the communication control server 4 from the space management server 5 according to the amount of data transmitted per unit time to the user terminal 6 from the communication control server 4 in the past. Hence, event information which cannot be transmitted to the user terminal 6 can be kept stored in the temporary buffer and the contents of the temporary buffer can be updated as needed to reduce the transmission of unnecessary data.

The embodiment of the present invention is not limited to the above-mentioned type. For example, a plurality of communication control servers 4 and a plurality of space management servers 5 are present for a single virtual space V in the description above. Even when there is a single communication control server 4, however, the process of transition of a partial space Vp can be realized without interrupting the processing of the user terminal 6 when the communication control server 4 relays communication between the user terminal 6 and any one of a plurality of space management servers 5. Even when there is a single space management server 5, the amount of transmission data from the space management server 5 to the communication control server 4 can be adjusted according to the amount of transmission data from the communication control server 4 to the user terminal 6 to update the contents of the temporary buffer of the space management server 5, thus reducing unnecessary data transmission.

While there have been described what are at present considered to be certain embodiments of the invention, it is understood that various modifications may be made thereto, and it is intended that the appended claims cover all such modifications as fall within the true spirit and scope of the invention.

What is claimed is:

1. A virtual space management system, comprising:
   a plurality of space management servers for respectively managing a plurality of partial spaces obtained by dividing a virtual space; and a communication control server for relaying communication between at least one of the plurality of space management servers and a user terminal, wherein:
a first of the plurality of space management servers comprises user transition control means operating to: (i) execute a process relating to a transition in which a position in the virtual space associated with the user terminal transitions from inside a first partial space which is managed by the first space management server to inside a second partial space which is managed by a second of the plurality of space management servers, (ii) notify the communication control server and the second space management server of an initiation of the transition from the first partial space to the second partial space;
the communication control server comprises connection destination management means operating, in response to the notification of the initiation of the transition from the first partial space to the second partial space: (i) to maintain communication connection with the user terminal during execution of the process relating to the transition even after receiving the notification of the initiation of the transition, and (ii) to buffer information received from the user terminal and not forward such information to the first or second space management servers;
the second space management server comprises a user transition control means operating to notify the communication control server of completion of the process relating to the transition; and
the connection destination management means operates, in response to the notification of the completion of the process relating to the transition: (i) to transmit the buffered information from the user terminal to the second space management server, and (ii) to change the transmission destination of the data received from the user terminal to the second space management server.

2. The virtual space management system according to claim 1, wherein during the execution of the process relating to the transition, the communication control server maintains the communication connection with the first space management server which manages the first partial space and the second space management server which manages the second partial space.

3. The virtual space management system according to claim 1, wherein:
the connection destination management means holds, as connection destination information, information specifying a space management server that manages a partial space to which the position in the virtual space associated with the user terminal belongs, and, when receiving a notification of completion of the transition, updates the connection destination information to information specifying a space management server that has made the notification; and
the communication control server determines the transmission destination of the data received from the user terminal by referring to the connection destination information.

4. A communication control server for relaying communication between at least one of a plurality of space management servers for respectively managing a plurality of partial spaces obtained by dividing a virtual space, and a user terminal, the communication control server comprising:
connection destination management means for: (i) receiving a notification from a first of the plurality of space management servers of an initiation of a transition in which a position in the virtual space associated with the user terminal transitions from inside a first partial space which is managed by the first space management server to inside a second partial space which is managed by a second of the plurality of space management servers, (ii) in response to the notification of initiation of the transition, maintaining communication connection with the user terminal while the second space management server is executing a process relating to the transition, even after receiving the notification of the initiation of the transition, (iii) in response to the notification of initiation of the transition, buffering information received from the user terminal and not forwarding such information to the first or second space management servers (iv) receiving a notification from the second of the plurality of space management servers of completion of the process relating to the transition, (v) in response to receiving the notification of completion of the transition, transmitting the buffered information from the user terminal to the second space management server, and (vi) changing a transmission destination of data received from the user terminal to the second space management server according to the transition.

5. A control method for a communication control server for relaying communication between at least one of a plurality of space management servers for respectively managing a plurality of partial spaces obtained by dividing a virtual space, and a user terminal, the control method comprising:
receiving a notification from a first of the plurality of space management servers of an initiation of a transition in which a position in the virtual space associated with the user terminal transitions from inside a first partial space which is managed by the first space management server to inside a second partial space which is managed by a second of the plurality of space management servers;
in response to the notification of initiation of the transition, maintaining communication connection with the user terminal while the second space management server is executing a process relating to the transition, even after receiving the notification of the initiation of the transition;
in response to the notification of initiation of the transition, buffering information received from the user terminal and not forwarding such information to the first or second space management servers;
receiving a notification from the second of the plurality of space management servers of completion of the process relating to the transition;
in response to receiving the notification of completion of the transition, transmitting the buffered information from the user terminal to the second space management server; and
in response to receiving the notification of completion of the transition, changing a transmission destination of data received from the user terminal to the second space management server according to the transition.

6. A non-transitory, computer readable information recording medium, storing a program for causing a communication control server for relaying communication between at least one of a plurality of space management servers for respectively managing a plurality of partial spaces obtained by dividing a virtual space, and a user terminal, to function as:
connection destination management means for: (i) receiving a notification from a first of the plurality of space management servers of an initiation of a transition in which a position in the virtual space associated with the user terminal transitions from inside a first partial space which is managed by the first space management server to inside a second partial space which is managed by a second of the plurality of space management servers, (ii) in response to the notification of initiation of the transition, maintaining communication connection with the user terminal while the second space management server is executing a process relating to the transition, even after receiving the notification of the initiation of the transition, (iii) in response to the notification of initiation of the transition, buffering information received from the user terminal and not forwarding such information to the first or second space management servers (iv) receiving a notification from the second of the plurality of space management servers of completion of the process relating to the transition, (v) in response to receiving the notification of completion of the transition, transmitting the buffered information from the user terminal to the second space management server, and (vi) changing a transmission destination of data received from the user terminal to the second space management server according to the transition.

* * * * *